A. T. WRIGHT.
Bee-Hives.
No. 142,318. Patented August 26, 1873.
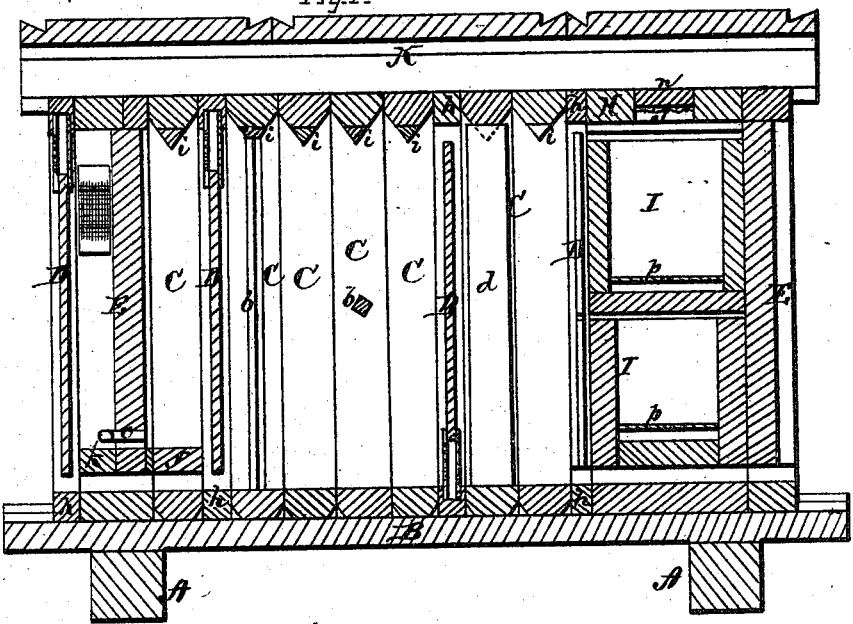
Fig. 1.
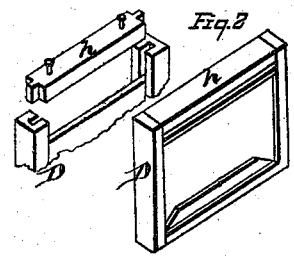 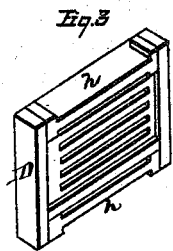 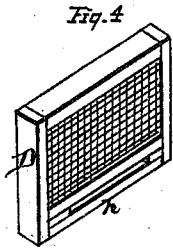 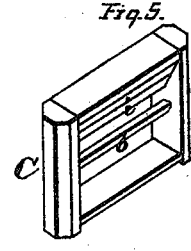
Fig. 2. Fig. 3. Fig. 4. Fig. 5.
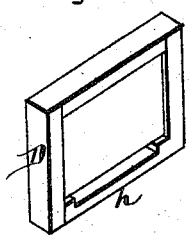 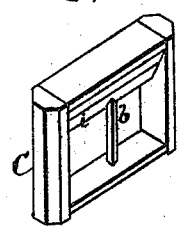 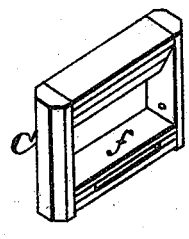 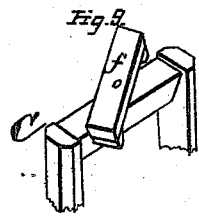
Fig. 6. Fig. 7. Fig. 8. Fig. 9.
Witness:
Jas. C. Hutchinson
C. L. Evers
Inventor.
A. T. Wright
per Alexander Mason
Attorneys.

A. T. WRIGHT.
Bee-Hives.

No. 142,318.

2 Sheets--Sheet 2.

Patented August 26, 1873.

Witnesses.
James E. Hutchinson
C. L. Evert

Inventor.
A. T. Wright
per Alexander Mason
Attorneys.

UNITED STATES PATENT OFFICE.

ALLEN T. WRIGHT, OF OSKALOOSA, IOWA.

IMPROVEMENT IN BEE-HIVES.

Specification forming part of Letters Patent No. 142,318, dated August 26, 1873; application filed June 26, 1872.

*To all whom it may concern:*

Be it known that I, A. T. WRIGHT, of Oskaloosa, in the county of Mahaska and in the State of Iowa, have invented certain new and useful Improvements in Bee-Hives; and do hereby declare that the following is a full, clear, and exact description thereof, reference being had to the accompanying drawings and to the letters of reference marked thereon, making a part of this specification.

The nature of my invention consists in the construction and arrangement of a bee-hive, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my bee-hive, and Figs. 2 to 19 are detached views of the various parts composing the same.

Figure 12:
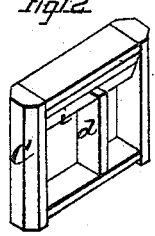
Figure 17:
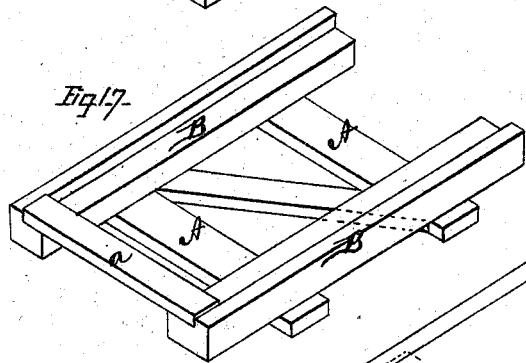
Figure 18:
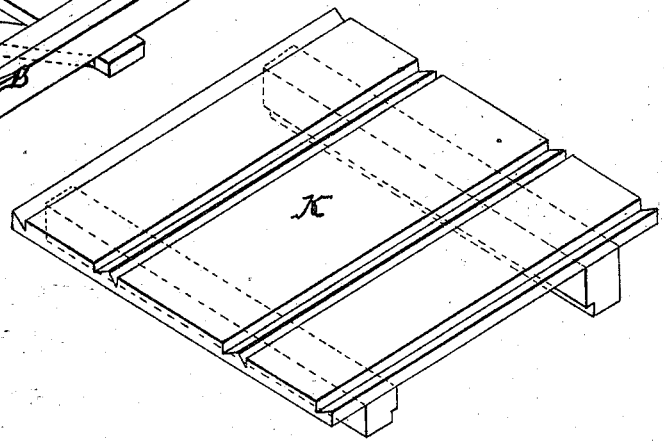
Figure 19:
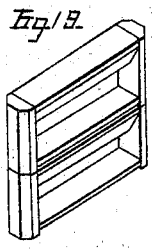

The hive-support, as shown more particularly in Fig. 17, is composed of cross-pieces A A and rabbeted side pieces B B, suitably connected together and braced, and provided at one end with a movable bar or board, $a$, to serve as an alighting-board. C C represent the comb-frames, all four sides of which are beveled, as shown, whereby I am enabled to make a stout, firm frame, with narrow surfaces of the parts to be united, thereby avoiding the crushing of bees while manipulating the frames when occupied with bees. On the under side of the top bar of each frame runs a triangular comb-guide, $i$. In the frame shown in Fig. 7 I have represented a central diamond-shaped vertical bar, $b$, which is designed to be used in large comb-frames while the combs are new and tender. As the combs become older and stronger these bars can be removed without endangering the breaking down of the combs of honey or brood. Fig. 12 shows a flat broad vertical bar, $d$, in the center of the comb-frame, which is used for the same purpose, but more especially to support surplus honey. One or more of them may be used in one frame when circumstances require their use. These vertical bars when used support the honey and separate it into different parts, and with them large frames of honey may be shipped safely from one part of the country to another. The diamond-shaped bars $b$ may be used horizontally, as shown in Fig. 5, but arranging them vertically, as above set forth, is preferable in the actual manipulation of the frames. Figs. 8 and 9 show movable and reversible bars $f$ placed on either the top or bottom bar of the frame, said movable bars having lugs or projections at the ends to form a passage between the frame proper and said movable bar. These movable and reversible bars are to be used for forming passages for the bees, as shown in Fig. 1, when desired to inclose a certain part of the hive and allow the bees to pass in and out of the remaining part; or they may be reversed so as to close said passage. They may be used either on the top or bottom bars of the frames, according to the location and arrangement of the frames. D D represent the screens used between the frames as desired. All of these screens have reversible bars $h$ at the top or bottom, or both, which can be placed so as to form a bee-passage or to close the same, as required. The construction of these reversible bars is more fully shown in Fig. 2.

The material of which these screens are made is varied. I may use glass for admitting light and excluding air, wire-cloth, as shown in Fig. 4, or perforated plates, as shown in Fig. 1, as a means for ventilation and for confining a portion or all of the bees. When used to confine the queen to the brood-compartment of the hive I arrange it as shown in Fig. 1, and between the brood-frames and those designed for surplus honey. When placed between the brood and nursery, or queen and drone compartments, the reversible bar $h$ is arranged so that the worker-bees can pass through it and beneath the removable and reversible bars $f$ of the frames, and when placed in front of the hive for admitting light or air, I arrange it either end up, as occasion requires.

Figure 10:
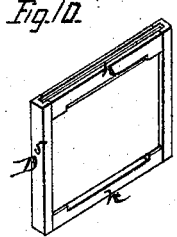
Figure 11:
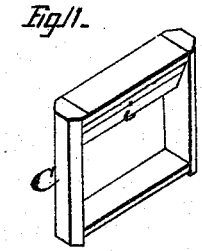
Figure 13:
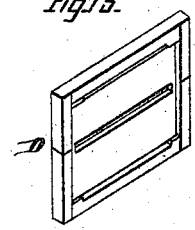
Figure 14:
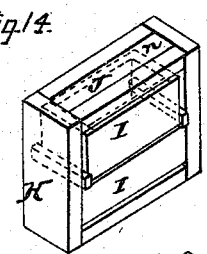
Figure 15:
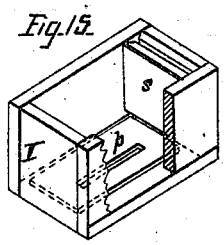
Figure 16:
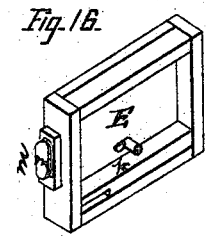

The screens shown in Figs. 3, 10, and 13 are made of paneled boards with reversible bars at the top and bottom, and are used as honey-guides. They serve for securing straight combs of uniform thickness in the frames when filled with honey, and also serve as division-boards when propagating queens. When used as honey-guides they may have one or more slots or spaces through them.

E E represent the end pieces of the hive, having reversible and movable bars $k$ at the upper or lower sides, so as to form entrances for the bees or not, as desired. They are also provided with openings $o$ for the passage of the bees of the nursery-compartment. On the sides of the end pieces are ear projections $m$, to form external fastenings to connect the cords to for binding the several parts of the hive together. H represents a frame for containing one or more feed-boxes I. In the top of said box is a ventilating-screen, J, with a removable bar, $n$, on top, so as to close or open this screen at pleasure. In the feed-box is a float, $p$, and at one end is a partition, $s$, forming a narrow passage, which communicates with the interior of the box, and through which liquid food may be introduced into the box without any liability of drowning or wetting the bees that may be in the box at the time. K represents the cover, constructed in any suitable manner to form an inclined roof when the hive is placed in a level position.

Having thus fully described my invention, what I claim as new, and desire to secure by Letters Patent, is—

1. The comb-frames C, the external bars of which are cut away or beveled about one-half the distance between the outer and inner faces, so that the frames may be placed edge to edge, and in opening them the bees will not be crushed, as set forth.

2. The combination of the comb-frames C, having external beveled edges, as set forth, the V-shaped comb-guides $i$, and one or more detachable intermediate bars, $b$, all as and for the purposes set forth.

3. The screen D, provided with the removable and reversible bar $h$, as and for the purposes set forth.

4. The end piece E, provided with the removable and reversible bar $k$ and ear projections $m$, substantially as and for the purposes herein set forth.

5. The frame H for containing one or more feed-boxes, I, and provided with a screen, J, on its top and movable bar $n$ on top of said screen, substantially as and for the purposes herein set forth.

In testimony that I claim the foregoing I have hereunto set my hand this 3d day of May, A. D. 1872.

A. T. WRIGHT.

Witnesses:
J. M. LOUGHBRIDGE,
JAMES McMULLEN.